United States Patent
Nenner et al.

(10) Patent No.: US 8,768,389 B2
(45) Date of Patent: Jul. 1, 2014

(54) TRANSMISSION OF A SHORT MESSAGE IN EVOLVED PACKET SYSTEM

(75) Inventors: Karl Heinz Nenner, Bornheim (DE); Dieter Jacobsohn, Bonn (DE)

(73) Assignee: Deutsche Telekom AG, Bonn (DE)

( * ) Notice: Subject to any disclaimer, the term of this patent is extended or adjusted under 35 U.S.C. 154(b) by 7 days.

(21) Appl. No.: 13/387,774

(22) PCT Filed: Jul. 29, 2010

(86) PCT No.: PCT/EP2010/004645
§ 371 (c)(1),
(2), (4) Date: Jan. 30, 2012

(87) PCT Pub. No.: WO2011/012305
PCT Pub. Date: Feb. 3, 2011

(65) Prior Publication Data
US 2012/0135761 A1      May 31, 2012

Related U.S. Application Data

(60) Provisional application No. 61/230,562, filed on Jul. 31, 2009.

(30) Foreign Application Priority Data

Jul. 31, 2009   (EP) ..................... 09009912

(51) Int. Cl.
*H04W 4/00* (2009.01)
(52) U.S. Cl.
USPC ......................................... 455/466
(58) Field of Classification Search
None
See application file for complete search history.

(56) References Cited

U.S. PATENT DOCUMENTS

| | | | |
|---|---|---|---|
| 2004/0249952 A1* | 12/2004 | Roderique | 709/227 |
| 2005/0070260 A1* | 3/2005 | Mazzara | 455/414.2 |
| 2006/0270409 A1 | 11/2006 | Voss et al. | |
| 2011/0021216 A1* | 1/2011 | Pudney et al. | 455/466 |
| 2011/0268084 A1 | 11/2011 | Tanabe et al. | |
| 2012/0218889 A1* | 8/2012 | Watfa et al. | 370/230 |

FOREIGN PATENT DOCUMENTS

| | | |
|---|---|---|
| JP | 2009049815 A | 3/2009 |
| WO | WO 2010022935 A1 | 3/2010 |

OTHER PUBLICATIONS

Vodafone, China Mobile, Alcatel-Lucent, CAAT, Huawei, Starent, ZTE, SMS over LTE #GPP TSG SA #44 SP-090429, Aruba, Jun. 1-4, 2009.*
3GPP Draft; S2-094610, "Discussion on the technical aspects of Native SMS over LTE," 3rd Generation Partnership Project (3GPP), Mobile Competence Centre ; 650, route des Lucioles ; F-06921 Sophia-Antipolis Cedex ; France, Jun. 30, 2009, p. 1-7.

(Continued)

*Primary Examiner* — German J Viana Di Prisco
(74) *Attorney, Agent, or Firm* — Leydig, Voit & Mayer, Ltd.

(57) ABSTRACT

A core network is provided for transmission of short messages in an Evolved Packet System (EPS) mobile communication network. The core network provides SMS over SGs functionality and includes: a Mobility Management Entity (MME); a Short Message Service Center (SMSC); and a unit providing an Interworking, Function (IWF) for handling of short messages; wherein the MME and the SMSC are in direct communication via the IWF with respect to communication of a short message with respect to a User Equipment (UE) having a data connection to the EPS mobile communication network.

10 Claims, 7 Drawing Sheets

(56) References Cited

OTHER PUBLICATIONS

3GPP Draft; S2-094958, "SMS over SGs for data only UEs", 3rd Generation Partnership Project (3GPP), Mobile Competence Centre ; 650, route des Lucioles ; F-06921 Sophia-Antipolis Cedex ; France, Jul. 10, 2009, p. 1-18.

3GPP "3rd Generation Partnership Project; Technical Specification Group Services and System Aspects;Study on Circuit Switched (CS) domain services over evolvedPacket Switched (PS) access; Stage 2(Release 9)", 3GPP Draft; 3rd Generation Partnership Project (3GPP), Mobile Competence Centre ; 650, route des Lucioles ; F-06921 Sophia-Antipolis Cedex ; France, Feb. 20, 2009, p. 1-61.

ETSI TR 21.905,v8.8.0, Digital cellular telecommunications system (Phase 2+); Universal Mobile Telecommunications System (UMTS); LTE; Vocabulary for 3GPP Specifications (3GPP TR 21.905 version 8.8.0 Release 8), Apr. 2009, p. 41.

TS23.401, v8.6.0, 3rd Generation Partnership Project; Technical Specification Group Services and System Aspects; General Packet Radio Service (GPRS) enhancements for Evolved Universal Terrestrial Radio Access Network (E-UTRAN) access (Release 8), Jun. 2009, p. 1-227.

3GPP TS 23.040 V8.5.0, 3rd Generation Partnership Project; Technical Specification Group Core Network and Terminals; Technical realization of the Short Message Service (SMS), (Release 8), Jun. 2009, p. 1-201.

European Patent Office, International Search Report in International Patent Application No. PCT/EP2010/004645 (Oct. 5, 2010).

Vodafone, Discussion on the the technical aspects of "Native SMS over LTE", 3GPP TSG SA WG2 Meeting #74 TD S2-094610, 3GPP, 2009, Jul. 10.

\* cited by examiner

TRANSMISSION OF A SHORT MESSAGE IN EVOLVED PACKET SYSTEM

CROSS-REFERENCE TO RELATED APPLICATIONS

This patent application is a national stage entry under 35 U.S.C. §371 of International Application No. PCT/EP2010/004645, filed Jul. 29, 2010, and claims priority to European Patent Application No. EP 09 009 912.8, filed Jul. 31, 2009, and U.S. Provisional Patent Application No. 61/230,562, filed Jul. 31, 2009. The International Application was published in English on Feb. 3, 2011, as WO 2011/012305 A1.

FIELD

The present invention relates a core network for the transmission of a short message in an Evolved Packet System, wherein the Core Network comprises a Mobile Switching Center (MSC) according to a GERAN/UTRAN radio access network standard (GSM/UMTS mobile telecommunication network). The present invention further relates to a method for handling a short message in such an Evolved Packet System (EPS) mobile radio access network, a Unit providing an Interworking Function (IWF), a Short Message Service Center (SMSC), a Mobility Management Entity (MME) and a program comprising a computer readable program code.

BACKGROUND

In order to provide SMS functionality for User Equipment (UE) having a data connection to an Evolved Packet System (EPS) mobile telecommunication network, it has been suggested to use either so-called "native" solutions, i.e. the transport of short messages solely by using Packet Switched (PS) core network entities (or "SMS via EPS"), or a so-called Circuit Switched Fallback (CSFB) solution. The introduction of a native solution of a short message service in the Evolved Packet System (EPS) (SMS via EPS) has not been retained within the 3GPP standardization process. Alternative to a native Evolved Packet System (EPS) solution for the transport of short messages is to at least partly use Circuit Switched (CS) entities or components of the core network. Hereinafter, such use of Circuit Switched (CS) entities or components of the core network are also called Circuit Switched (CS) fallback solutions. One Circuit Switched Fallback (CSFB) solution supports not only the SMS service (Short Message Service) but also its main target, voice service. The mechanism for voice support is to fall back to a GERAN/UTRAN cell (second/third Generation network cell) that supports a circuit switched voice communication (CS voice) when the User Equipment (UE) receives or wishes to place a voice call. For Circuit Switched Fallback (CSFB) to work, a close alignment between the circuit switched (CS) Location Areas (LA) and the Evolved Packet System (EPS) Tracking Areas (TA) needs to be managed and configured in the network, based on the actual coverage areas of the cells that belong to the Location Areas (LAs) or Tracking Areas (TAs), respectively. Circuit Switched Fallback (CSFB) is considered an interim solution during the migration towards IMS (IP Multimedia Subsystem) voice.

There are reasons why Circuit Switched Fallback (CSFB), in its original form (i.e. also involving Circuit Switched (CS) voice service), is not well-suited for SMS. For example, falling back to a circuit switched (CS) capable access every time a short message is to be sent or received, seems like overkill and could break the User Equipment's (UE) Evolved Packet System (EPS) data connection every time when the User Equipment (UE) needs to move to GERAN (second generation mobile radio access network). For this reason, it has been suggested to extend Circuit Switched Fallback (CSFB) to allow sending and receiving the short messages via the Mobility Management Entity (MME) of the EPS rather than falling back onto GERAN (2G) or UTRAN (3G) functionality (i.e. performing a complete fallback to Circuit Switched (CS) functionality). To this end, the SGs interface between the Mobility Management Entity (MME) and the Mobile Switching Center (MSC), that is needed in Circuit Switched Fallback (CSFB) in order to both create, and maintain, both the attachment of the User Equipment to the Mobile Switching Center (MSC) for a User Equipment (UE) connected to or requesting a connection to the Evolved Packet System (EPS) and to perform paging for mobile terminating call, was extended to allow also the transfer of short messages to and from the UE. According to ETSI TR 21.905 V8.8.0, the term MME stands for Mobile Management Entity; according to TS23.401, V8.6.0 this term stands for Mobility Management Entity; hereinafter, the term Mobility Management Entity is used.

With such an approach, full Circuit Switched Fallback (CSFB)—i.e. including voice support—must be implemented in an operator's network even when only SMS support is desired by a User Equipment (UE). So, even an SMS-only target for Circuit Switched Fallback (CSFB) comes with the inherent disadvantage of having to upgrade all the MSCs, and to closely align the location areas (LAs) of the circuit switched (CS) network components with the Evolved Packet System (EPS) tracking areas (TAs), as this is necessary for proper association of the Mobility Management Entity (MME) with the Mobile Switching Center (MSC) per Circuit Switched Fallback (CSFB) User Equipment (UE). With another Circuit Switched (CS) fallback solution, the so-called "SMS via SGs" solution within 3GPP (Third Generation Partnership Project) (as defined in document S2-094958 of the 3GPP technical working group SA2), an SGs interface is only used to establish and maintain the association between the Mobility Management Entity (MME) and the Mobile Switching Center (MSC), and, to transfer short messages. All functionality needed for voice is eliminated, and a fallback to a CS access does not take place (to provide only an SMS functionality) since the short messages are relayed between the MSC and the UE via the MME, using the SGs interface. To enable this solution, the UE may be attached to the CS system only for SMS support. Nevertheless, this solution still has the drawback that a modified MSC is needed.

SUMMARY

In an embodiment, the present invention provides a core network for transmission of short messages in an Evolved Packet System (EPS) mobile communication network. The core network provides SMS over SGs functionality and includes: a Mobility Management Entity (MME); a Short Message Service Center (SMSC); and a unit providing an Interworking Function (IWF) for handling of short messages. The MME and the SMSC are in direct communication via the IWF for communication of the short messages with respect to a User Equipment (UE) having a data connection to the EPS mobile communication network.

DETAILED DESCRIPTION

Figure 1:
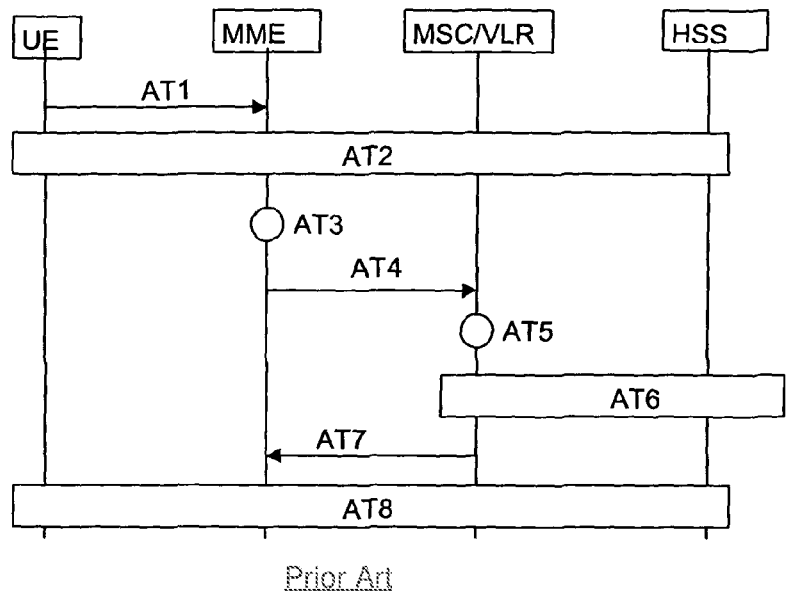
FIG. 1 schematically illustrates an attach procedure of a User Equipment to an Evolved Packet System (EPS) within a 3GPP framework.

In an embodiment, the present invention provides a core network for the transmission of a short message in an Evolved Packet System (EPS), wherein the Core Network comprises a Mobile Switching Center (MSC) according to a GERAN/UTRAN radio access network standard (GSM/UMTS mobile communication network) and wherein standard functionality according to, e.g., a GERAN network of the Mobile Switching Centers (MSC) can be used. Thereby, Circuit Switched (CS) entities and components of the core network are used for the transport of short messages. A further object of the present invention is to provide a method for the handling of a short message in such an Evolved Packet System (EPS) mobile radio access network, a Unit providing an Interworking Function (IWF), a Short Message Service Center (SMSC), a Mobility Management Entity (MME) and a program comprising a computer readable program code, allowing the standard functionality of the Mobile Switching Centers (MSC) according to, e.g., a GERAN network.

In an embodiment, the present invention provides a Core Network for the transmission of a short message in an Evolved Packet System (EPS) mobile communication network, the Core Network providing SMS over SGs functionality, the Core Network comprising a Mobility Management Entity (MME) and a Short Message Service Center (SMSC), and the Core Network further comprising a unit providing an Interworking Function (IWF) for the handling of short messages such that with regard to the transmission and/or the reception of short messages with respect to a User Equipment (UE) having a data connection to the Evolved Packet System (EPS) mobile communication network, direct communication is provided between the Mobility Management Entity (MME) and the Short Message Service Center (SMSC) via the Interworking Function (IWF).

This means that a Mobile Switching Center (MSC) does not need to be involved.

According to an embodiment of the present invention, a complete reutilization of existing interfaces, including interfaces of the Mobile Switching Center (MSC), is possible without modification of any existing network element being necessary. This is because all functionality of the SMS service for a User Equipment connected to the Evolved Packet System (EPS) resides within the unit providing the Interworking Function (IWF). Moreover, a simpler implementation of such functionality is possible according to the present invention relative to the "SMS via SGs" solution suggested within the framework of 3GPP.

According to an embodiment of the present invention, the Core Network comprises a Mobile Switching Center (MSC) according to a GERAN/UTRAN radio access network (GSM/UMTS mobile communication network) standard, wherein the Interworking Function (IWF) for the handling of short messages is provided such that the Mobile Switching Center (MSC) is bypassed with regard to the transmission and/or the reception of short messages with respect to a User Equipment (UE) having a data connection to the Evolved Packet System (EPS) mobile communication network.

It is advantageous that no interfaces or interface modifications to other Mobile Switching Centers (MSC) (or combinations of such with Visitor Location Registers (VLRs)) are needed.

According to an embodiment of the present invention, an implementation of Short Message Service (SMS) functionality, including via an SGs interface, is provided by defining an Interworking Function (IWF) that provides only the necessary functionality (for the SMS service). Advantageously, tangling with the existing Mobile Switching Centers (MSC base) is avoided.

According to an embodiment of the present invention, SMS functionality is integrated with an Evolved Packet System (EPS) in a much simpler fashion than previously known, namely by specifying an Interworking Function (IWF) for the necessary functions rather than enforcing an upgrade of all Mobile Switching Center (MSC) units. The functionality of the Interworking Function (IWF) is much less than a full-blown Mobile Switching Center (MSC); in essence, the Interworking Function (IWF) has only minimal functions of an Mobile Switching Center (MSC) in addition to what would have to be added to an Mobile Switching Center (MSC) in order to support SMS via SGs. Further simplifications of the overall functionality can be achieved when integrating the Interworking Function (IWF) into the Mobility Management Entity (MME) (e.g., no need for VLR number derivation and the SGs interface) or into the Short Message Service Center (SMSC) (e.g., no need for Home Subscriber Server (HSS) location area updating and the MAP interface towards the Short Message Service Center (SMSC)).

According to an embodiment of the present invention, the Core Network provides an SMS functionality for User Equipment (UE) having a data connection to the Evolved Packet System (EPS) mobile communication network, wherein the SMS handling is provided in a non-native manner with regard to the Evolved Packet System (EPS).

According to an embodiment of the present invention, the unit providing the Interworking Function (IWF) is an intermediate unit having an SGs interface with the Mobility Management Entity (MME) and an interface with the Short Message Service Center (SMSC) as defined in clause 4.2 in TS23.040 (clause 4.2 "Transfer on reference point 3" as described in 3GPP TS 23.040 version 8.5.0, which is incorporated herein by reference in its entirety). In the context of the present invention, such an interface is hereinafter also called an "SMSC-interface". Such an interface (or SMSC-interface) can, e.g., be realized by way of a MAP-interface (Mobile Application Part interface according to TS29.002), but it will be appreciated that other realizations are also possible according to TS23.040.

Thereby, it is advantageously possible according to an embodiment of the present invention that the Interworking Function (IWF) is implemented as a stand-alone element, which could then be centralized if so desired by the Operator. This implementation can be viewed as a reduced-function MSC, limited to the minimum functionality to support the SMS service via SGs for UEs in EPS. The Interworking Function (IWF) would expose the SGs interface towards the Mobility Management Entity (MME) as well as the D interface towards the Home Subscriber Server (HSS) and the interface towards the Short Message Service Center (SMSC) in the same way as a normal MSC, while no functionality or interfaces needed to support voice (e.g. towards a BSC/RNC or MGW) are present.

According to a further embodiment of the present invention, the unit providing the Interworking Function (IWF) is integrated in the Mobility Management Entity (MME), having an SMSC-interface with the Short Message Service Center (SMSC).

Thereby, it is advantageously possible that by integrating the Interworking Function (IWF) into the MME, a de-facto "native" SMS solution in EPS is possible to achieve. While the interfaces towards the Home Subscriber Server (HSS) and the Short Message Service Center (SMSC) would then be exposed by that "integrated MME", all SGs interactions would be internal to that integrated node (i.e., integrated MME). See TS23.040 (clause 4.2 "Transfer on reference point 3" according to 3GPP TS 23.040 version 8.5.0).

According to a further embodiment of the present invention, the unit providing the Interworking Function (IWF) is integrated in the Short Message Service Center (SMSC), having an SGs interface with the Mobility Management Entity (MME).

Thereby, it is advantageously possible that by integrating the Interworking Function (IWF) into the Short Message Service Center (SMSC), the need for VLR functionality and, thereby, the need to signal with the Home Subscriber Server (HSS), is eliminated. This "integrated SMSC" only needs the SGs interface—i.e., no Interface to the Home Subscriber Server (HSS), while the SMS-specific interactions between a normal MSC and the Short Message Service Center (SMSC) are internal to the "integrated SMSC". This results in a large amount of cost savings.

In an embodiment, the present invention provides a method for the handling of a short message in an Evolved Packet System (EPS) mobile telecommunication network, the method including the steps of: attaching a User Equipment (UE) to the circuit switched network parts, the circuit switched network parts comprising a Mobile Switching Center (MSC) according to a GERAN/UTRAN radio access network (GSM/UMTS mobile communication network) standard, and the User Equipment (UE) having or requesting a data connection to the Evolved Packet System (EPS) mobile radio access network; and transmitting the short message by using a unit providing an Interworking Function (IWF) for the handling of the short message such that the Mobile Switching Center (MSC) is bypassed with regard to the transmission and/or the reception of short messages.

It is thereby advantageously possible that a complete reutilization of existing interfaces, including interfaces of the Mobile Switching Center (MSC) as used for SMS, is possible and that no modification of any existing network element is necessary.

The present invention also relates to a Unit providing an Interworking Function (IWF) for the handling of short messages in an Evolved Packet System (EPS) mobile communication network having a Core Network, the Core Network comprising a Mobile Switching Center (MSC) according to a GERANUTRAN radio access network (GSM/UMTS mobile communication network) standard, the Core Network further comprising a Mobility Management Entity (MME) and a Short Message Service Center (SMSC), wherein the unit providing the Interworking Function (IWF) is an intermediate unit having an SGs interface with the Mobility Management Entity (MME) and an SMSC-interface with the Short Message Service Center (SMSC) as specified in clause 4.2 of TS23.040 (clause 4.2 "Transfer on reference point 3" according to 3GPP TS 23.040 version 8.5.0), wherein the handling of short messages is such that the Mobile Switching Center (MSC) is bypassed with regard to the transmission and/or the reception of short messages with respect to a User Equipment (UE) having a data connection to the Evolved Packet System (EPS) mobile radio access network.

In a further embodiment, the present invention relates to a Short Message Service Center (SMSC), having an integrated unit providing an Interworking Function (IWF) for the handling of short messages in an Evolved Packet System (EPS) mobile communication network having a Core Network, the Core Network comprising a Mobile Switching Center (MSC) according to a GERANUTRAN radio access network (GPRS/EDGE/UMTS mobile communication network) standard, the Core Network further comprising a Mobility Management Entity (MME), wherein the unit providing the Interworking Function (IWF) has an SGs interface with the Mobility Management Entity (MME), wherein the handling of short messages is such that the Mobile Switching Center (MSC) is bypassed with regard to the transmission and/or the reception of short messages with respect to a User Equipment (UE) having a data connection to the Evolved Packet System (EPS) mobile radio access network.

In another further embodiment, the present invention relates to a Mobility Management Entity (MME), having an integrated unit providing an Interworking Function (IWF) for the handling of short messages in an Evolved Packet System (EPS) mobile communication network having a Core Network, the Core Network comprising a Mobile Switching Center (MSC) according to a GERAN/UTRAN radio access network (GSM/UMTS mobile communication network) standard, the Core Network further comprising a Short Message Service Center (SMSC), wherein the unit providing the Interworking Function (IWF) has an SMSC-interface with the Short Message Service Center (SMSC) as specified in clause 4.2 of TS23.040 (clause 4.2 "Transfer on reference point 3" according to 3GPP TS 23.040 version 8.5.0), wherein the handling of short messages is such that the Mobile Switching Center (MSC) is bypassed with regard to the transmission and/or the reception of short messages with respect to a User Equipment (UE) having a data connection to the Evolved Packet System (EPS) mobile radio access network.

Additionally, in another embodiment, the present invention relates to a program comprising a computer readable program code for controlling a Unit providing an Interworking Function (IWF) for the handling of short messages in an Evolved Packet System (EPS) mobile communication access network, a Short Message Service Center (SMSC) and/or for controlling a Mobility Management Entity (MME) according to the present invention.

By way of a complete reutilization of existing interfaces, including interfaces of the Mobile Switching Center (MSC) as used for SMS, no modification of any existing network element is necessary.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, an attach procedure of a User Equipment (UE) to an Evolved Packet System (EPS) according to an "SMS via SGs" solution made within the 3GPP framework is schematically shown. A first step of the attach procedure, designated by AT1, corresponds to the attach request of the User Equipment (UE) towards the Mobility Management Entity (MME). A second step of the attach procedure, designated by AT2, corresponds to steps 2 to steps 17 of the Attach procedure specified in TS 23.401 (FIG. 5.3.2.1-1: "Attach procedure" as described in the document "3GPP TS 23.401 version 8.6.0", which is incorporated herein by reference in its entirety). A third step of the attach procedure, designated by AT3, corresponds to deriving the Visitor Location Register (VLR) number. A fourth step of the attach procedure, designated by AT4, corresponds to the Mobility Management Entity (MME) sending a Location Update Request to the Mobile Switching Center/Visitor Location Register (MSC/VLR). A fifth step of the attach procedure, designated by AT5, corresponds to the creation of an SGs association. A sixth step of the attach procedure, designated by AT6, corresponds to a Location update in the circuit switched domain. A seventh step of the attach procedure, designated by AT7, corresponds to the Mobile Switching Center/Visitor Location Register (MSC/VLR) sending a Location Update Accept to the Mobility Management Entity (MME). An eighth step of the attach procedure, designated by ATB, corresponds to steps 18 to steps 26 of the Attach procedure specified in TS 23.401 (FIG. 5.3.2.1-1: "Attach procedure" according to document "3GPP TS 23.401 version 8.6.0").

This means that the User Equipment (UE) has to perform a combined attach (i.e., attaching to both the Evolved Packet System (EPS) and the circuit switched (CS) system). For SMS only, the attach procedure is limited by either the User Equipment (UE) requesting attach to the MSC/VLR only for SMS, or by the network returning acceptance for SMS only. When the attach procedure is executed for SMS only, the third step of the attach procedure AT3 is implementation specific in the Mobility Management Entity (MME) and does not need to take into account the UE's reported Tracking Area Identity (TAI). In addition, the Location Area Identity (LAI) returned to the User Equipment (UE) does not need to correspond to an actual Location Area Identity (LAI) used in the CS network.

Figure 2:
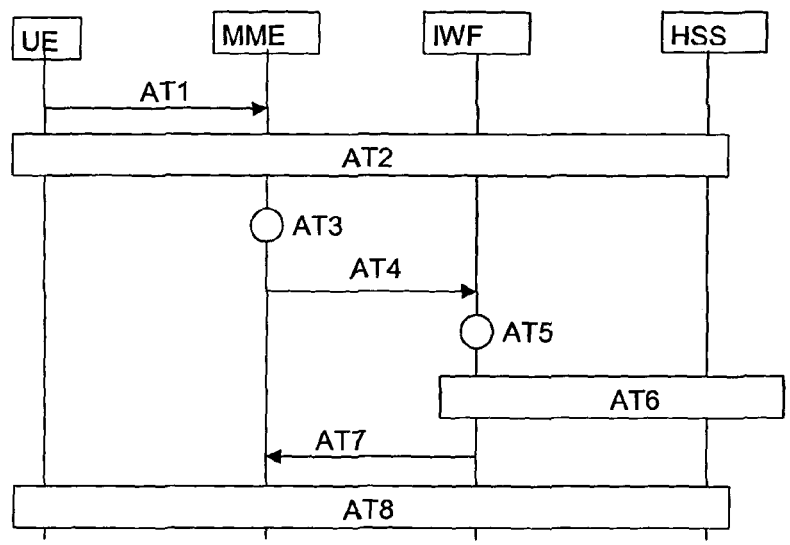
FIG. 2 schematically illustrates an attach procedure of a User Equipment to an Evolved Packet System (EPS) according to a first embodiment.

According to a first embodiment of the present invention, the Mobile Switching Center/Visitor Location Register (MSC/VLR) is replaced with the unit providing the Interworking Function (IWF). This is shown in FIG. 2, namely an attach procedure where a unit providing the Interworking Function (IWF) is a stand-alone entity. It is conceivable that there is logically only one Interworking Function (IWF) in the network so that the third step AT3 becomes a simple pre-configured address look-up. The functions of the Interworking Function (IWF) with respect to the SGs interface with the Mobility Management Entity (MME) and the D interface with the Home Subscriber Server (HSS) are the same as in FIG. 1; however, the Interworking Function (IWF) does not need to have any other functionality of a Mobile Switching Center (MSC).

If there is only one Interworking Function (IWF) in the network, the CS location update in the sixth step AT6 would not be needed, for the same reasons as described below with respect to FIG. 4 ("IWF integrated in SMSC" or third embodiment). However, dispensing with the location update in this embodiment would necessitate specific changes in the (otherwise unaffected) Short Message Service Center (SMSC) such as:

ability to attempt delivery of SMS via the—single—Interworking Function (IWF) without querying the HSS for the UE's location information (e.g. serving MSC/VLR), and ability to attempt SMS delivery towards a Mobile Switching Center/Visitor Location Register (MSC/VLR) based on a Home Subscriber Server (HSS) query when delivery via the Interworking Function (IWF) fails, and optionally, an algorithm that controls and optimizes the sequence in which the above SMS delivery attempts are executed.

Figure 3:
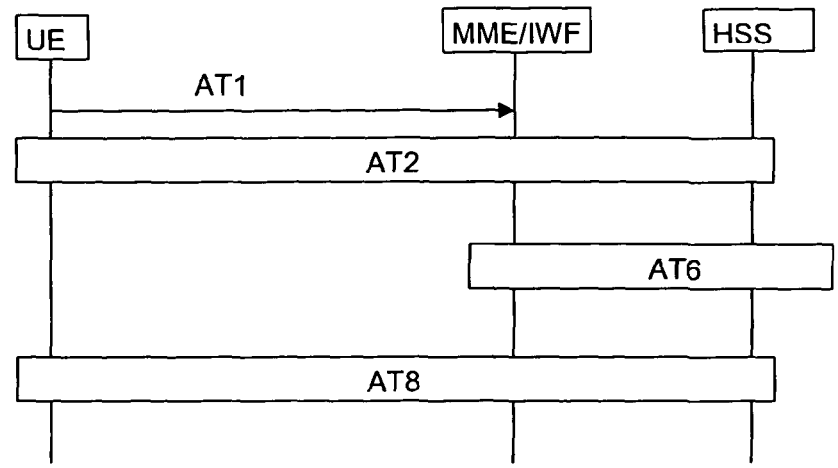
FIG. 3 schematically illustrates an attach procedure of a User Equipment to an Evolved Packet System (EPS) according to a second embodiment.

According to the second embodiment of the present invention, represented with regard to the attach procedure illustrated in FIG. 3, the Interworking Function (IWF) is integrated into the Mobility Management Entity (MME). The derivation of a VLR number in the third step AT3 of FIG. 1 is not necessary at all, and the fourth and fifth steps AT4, AT5 occur internally in the combined MME/IWF; i.e., there is no SGs interface. Here, the location update in the sixth step AT6 towards the Home Subscriber Server (HSS) is performed in order for the SMS Gateway Mobile Switching Center (SMS-GWMSC) to find the User Equipment (UE) for mobile terminating SMS (cf. below).

According to the third embodiment of the present invention, the Interworking Function (IWF) is integrated into the Short Message Service Center (SMSC). In that case, derivation of a VLR number in the third step AT3 of FIG. 1 is not necessary as typically there is only one Short Message Service Center (SMSC) in a network—in other words, the "derivation" degenerates to a simple pre-configuration (as already indicated with regard to FIG. 2 or the first embodiment) where this is also possible with a single logical Interworking Function (IWF) in the network). As a major difference to the scenario according to the second embodiment of the present invention, it is not necessary to perform a location update (sixth step AT6) in the CS domain; this is only needed for the SMSC's Gateway MSC to find the UE's Visitor Location Register (VLR) when a terminating short message is to be sent, which is not necessary when the IWF is integrated inside the SMSC (cf. below with respect to FIGS. 10 to 12). In consequence, there is only the SGs interface between the Mobility Management Entity (MME) and combined IWF/SMSC, while the SMSC-interface according to clause 4.2 of TS23.040 (clause 4.2 "Transfer on reference point 3" according to 3GPP TS 23.040 version 8.5.0) is internal to the combined IWF/SMSC.

Tracking Area Update

When the User Equipment (UE) performs a Tracking Area (TA)/Location Area (LA) update in the Evolved Packet System (EPS), the scenarios are equivalent to the attach scenarios or procedure described above. According to the present invention, similar simplifications in the signaling, the "derive Visitor Location Register (VLR) number" function, and in relation to Home Subscriber Server (HSS) signaling, occur. Furthermore, the SGs interface is not needed when the Interworking Function (IWF) is integrated in the Mobility Management Entity (MME), and no signaling with the Home Subscriber Server (HSS) is needed in the same circumstances as described in the Attach scenarios above.

It is not necessary for the Interworking Function (IWF) to retrieve any aspects of the User Equipment (UE) Mobility Management (MM) context from the old Mobile Switching Center/Visitor Location Register (MSC/VLR) when the UE performs an inbound Tracking Area Update (TAU) from 2G or 3G. It is also not necessary for the Interworking Function (IWF) to retrieve any information from the old Interworking Function (IWF) in case of a change of Interworking Function (IWF) while the User Equipment (UE) moves within the network.

In situations where the Interworking Function (IWF) may not perform CS location update with the Home Subscriber Server (HSS), the old Mobile Switching Center/Visitor Location Register (MSC/VLR) remains stored in the Home Subscriber Server (HSS) when the User Equipment (UE) moves from GERAN/UTRAN, where it is served by a Mobile Switching Center/Visitor Location Register (MSC/VLR), into Evolved Packet System (EPS) where it is served for SMS only by the Interworking Function (IWF) according to the present invention. The UE's location will also not be cancelled in the old Mobile Switching Center/Visitor Location Register (MSC/VLR). This is, however, negligible from the perspective of SMS support since:

the Short Message Service Center (SMSC) will not make use of Mobile Switching Center/Visitor Location Register (MSC/VLR) information from the Home Subscriber Server (HSS) for SMS delivery via the Interworking Function (IWF) according to the present invention, the Short Message Service Center (SMSC) may use the Mobile Switching Center/Visitor Location Register (MSC/VLR) information from the Home Subscriber Server (HSS) for SMS delivery via the Mobile Switching Center/Visitor Location Register (MSC/VLR) when delivery via the Interworking Function (IWF) fails, when the SMS delivery via the old Mobile Switching Center/Visitor Location Register (MSC/VLR) fails, normal 3GPP error procedures will be performed.

According to the present invention, other location dependent applications will need to prefer Evolved Packet System (EPS) location information over circuit switched (CS) location information in order to avoid failure of their location services due to the fact that the Mobile Switching Center/Visitor Location Register (MSC/VLR) stored in the Home Subscriber Server (HSS) may be obsolete. In case of an incoming CS call, the network would still attempt to deliver the call via the old Mobile Switching Center (MSC).

Failure of SMS delivery via the Mobile Switching Center/Visitor Location Register (MSC/VLR), or terminating call attempts, will indicate to the network that the UE is no longer reachable via the obsolete Mobile Switching Center/Visitor Location Register (MSC/VLR) according to standard 3GPP functionality.

Location Area Update

According to the present invention, there is no change in the location update or combined Tracking Area (TA)/Location Area (LA) update procedure defined in 3GPP. However, it may not be possible for the new Mobile Switching Center/Visitor Location Register (MSC/VLR) to retrieve User Equipment (UE) Mobility Management (MM) context information from the old Mobile Switching Center/Visitor Location Register (MSC/VLR), the latter being in fact a Interworking Function (IWF) according to the present invention. This is not an issue since the 3GPP standards specify the system behavior for recovery from this situation, as it can anyway occur in the 2G/3G system at any time.

In deployments where the Interworking Function (IWF) does not perform signaling with the Home Subscriber Server (HSS), it can also not be informed when the User Equipment (UE) moves to a "real" Mobile Switching Center/Visitor Location Register (MSC/VLR), e.g. upon Location Area (LA) update or combined Routing Area (RA)/Location Area (LA) update. The Short Message Service Center (SMSC) will then still try to send terminating short messages via the Interworking Function (IWF), which will fail. Therefore, the Short Message Service Center (SMSC) should be capable of attempting to deliver SMS both via the Interworking Function (IWF) and via the Mobile Switching Center/Visitor Location Register (MSC/VLR) retrieved from the Home Subscriber Server (HSS). The priority order of the two routes may then depend on most recently sent/received short messages and/or delivery failures via a particular route, or another algorithm.

Detach Procedure

The scenarios for the Detach procedure work in the same way as the Attach, with the same differences and simplifications compared to the procedure depicted in FIG. 1, depending on which embodiment of the present invention is used.

SMS Handling

It should be noted that a typical Short Message Service Center (SMSC) product encompasses the functions of the Service Center (SC), SMS-IWMSC (SMS interworking Mobile Switching Center (MSC)), and SMS-GWMSC (SMS Gateway Mobile Switching Center (MSC)). Therefore, the message exchange between the SMS-IWMSC/SMS-GWMSC and the SC is usually internal to the Short Message Service Center (SMSC). Note that the SMS-IWMSC is only applicable in the Mobile Originated (MO) case, while the SMS-GWMSC is only applicable in the Mobile Terminated (MT) case, which is reflected in FIGS. 5 to 12. All these Figures show the flow for SMS transfer only. It is a prerequisite that the UE attaches or performs an inbound combined Tracking Area (TA)/Location Area (LA) update in Evolved Packet System (EPS), as described above, before any SMS transfer can occur. The association between the Mobility Management Entity (MME) and the Interworking Function (IWF) for a User Equipment (UE) is created upon User Equipment (UE) attach or Tracking Area (TA)/Location Area (LA) update.

Mobile Originating (MO) SMS Case

Figure 5:
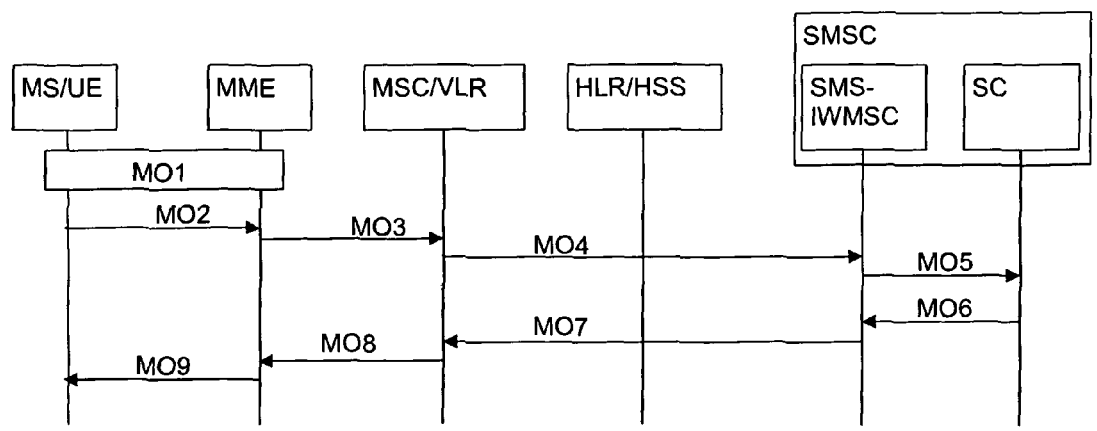
FIG. 5 schematically illustrates handling of a mobile originating short message within a 3GPP framework.

In the Mobile Originating (MO) case, there is a SMS-IWMSC function—usually implemented in the Short Message Service Center (SMSC)—that receives the short messages from the network via a SS7/MAP signaling interface. The procedure according the 3GPP standard is shown in FIG. 5.

In a first step of the Mobile Originated (MO) procedure, designated by MO1, the Mobile Station (MS) or User Equipment (UE) sends a Service Request towards the Mobility Management Entity (MME). A second step of the MO procedure, designated by MO2, corresponds to sending an Uplink NAS Transport information from the User Equipment (UE) to the Mobility Management Entity (MME). A third step of the MO procedure, designated by MO3, corresponds to the Mobility Management Entity (MME) sending an Uplink Unitdata information to the Mobile Switching Center/Visitor Location Register (MSC/VLR). A fourth step of the MO procedure, designated by MO4, corresponds to the Mobile Switching Center/Visitor Location Register (MSC/VLR) forwarding the short message to the SMS-IWMSC of the Short Message Service Center (SMSC). A fifth step of the MO procedure, designated by MO5, corresponds to the message transfer from the SMS-IWMSC to the SC of the Short Message Service Center (SMSC) and a sixth step of the MO procedure, designated by MO6, corresponds to sending a Delivery report from the SC to the SMS-IWMSC of the Short Message Service Center (SMSC). A seventh step of the MO procedure, designated by MO7, corresponds to sending the Delivery report from the Short Message Service Center (SMSC) to the Mobile Switching Center/Visitor Location Register (MSC/VLR). An eighth step of the MO procedure, designated by MO8, corresponds to the Mobility Management Entity (MME) receiving a Downlink Unitdata from the Mobile Switching Center/Visitor Location Register (MSC/VLR). A ninth step of the MO procedure, designated by MO9, corresponds to the User Equipment (UE) receiving a Downlink NAS Transport information by the Mobility Management Entity (MME).

The first step MO1 of the MO procedure is only necessary when the UE is in idle mode. A User Equipment (UE) in active mode can commence the SMS transfer with the second step MO2 of the MO procedure. This applies to all SMS MO cases.

Figure 6:
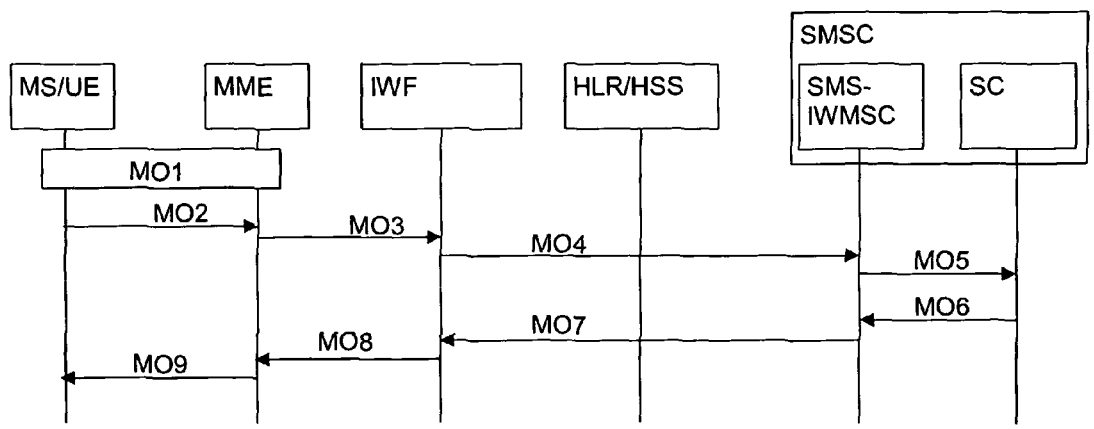
FIG. 6 schematically illustrates handling of a mobile originating short message according to a first embodiment.

The Mobile Originated (MO) procedure according to the first embodiment of the present invention is shown in FIG. 6. The Mobile Switching Center/Visitor Location Register (MSC/VLR) is replaced by the Interworking Function (IWF), which exposes both the SGs interface to the Mobility Management Entity (MME) and the interface to the Short Message Service Center (SMSC) as specified in TS23.040 (clause 4.2 "Transfer on reference point 3" according to 3GPP TS 23.040 version 8.5.0). Analogous to FIG. 2, the functionality related to the SGs and D interfaces in the first embodiment (FIG. 6) is the same as in FIG. 5, but otherwise the Interworking Function (IWF) has only those functions that are needed for SMS transfer.

Figure 7:
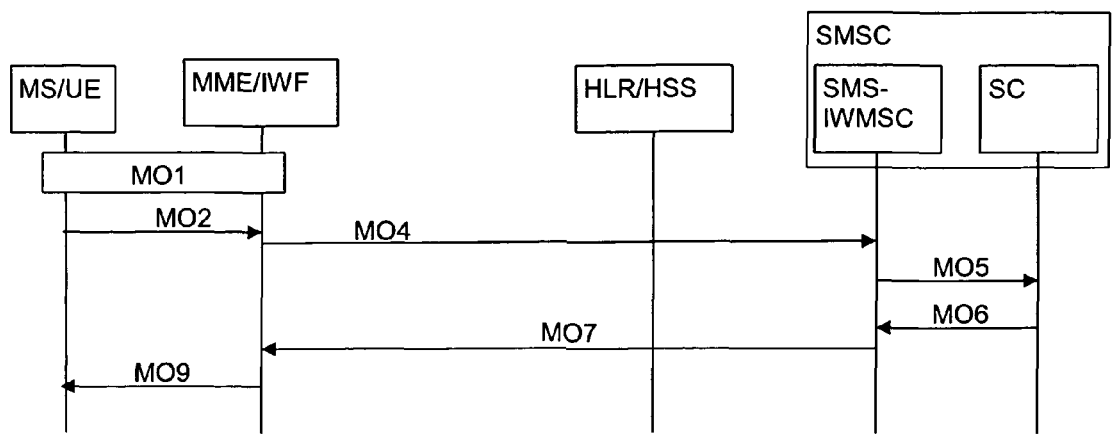
FIG. 7 schematically illustrates handling of a mobile originating short message according to a second embodiment.

The Mobile Originated (MO) procedure according to the second embodiment of the present invention is shown in FIG. 7. Analogous to FIG. 3 for the Attach case according to the second embodiment, the Interworking Function (IWF) is integrated into the Mobility Management Entity (MME), resulting in the signaling flow depicted in FIG. 7. Here, no SGs interface is needed (and corresponding third and eighth steps MO3 and MO8 can be omitted)—the combined MME/IWF sends the short message (in the fourth step MO4) using the existing interface towards the Short Message Service Center (SMSC), as specified in TS23.040 (clause 4.2 "Transfer on reference point 3" according to 3GPP TS 23.040 version 8.5.0, and receives the short message in the seventh step MO7.

Figure 8:
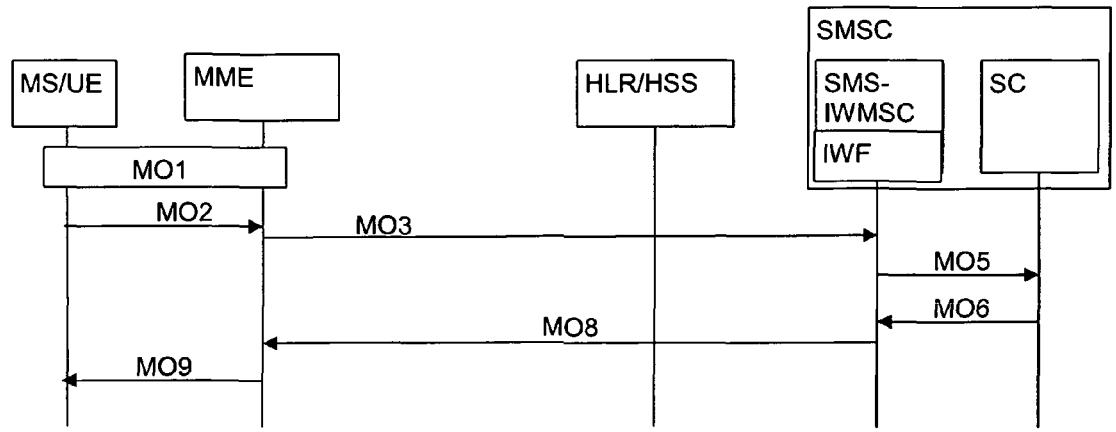
FIG. 8 schematically illustrates handling of a mobile originating short message according to a third embodiment.

The Mobile Originated (MO) procedure according to the third embodiment of the present invention is shown in FIG. 8. Analogous to FIG. 4, the Interworking Function (IWF) is integrated into the Short Message Service Center (SMSC). The interface as specified in TS23.040 (clause 4.2 "Transfer on reference point 3" according to 3GPP TS 23.040 version 8.5.0) is not needed, while the SGs interface is used between the Mobility Management Entity (MME) and the combined SMSC/IWF for SMS transfer, i.e. the fourth and seventh step MO4, MO7 are omitted and the third and eighth steps MO3, MO8 (Uplink Unitdata, Downlink Unitdata) are used.

Mobile Terminating (MT) SMS Case

In the Mobile Terminating (MT) case, depicted in FIGS. 9 to 12, there is a SMS-GWMSC function—usually implemented in the Short Message Service Center (SMSC)—that locates the User Equipment (UE) by means of a query towards the Home Subscriber Server (HSS). With the information received from the Home Subscriber Server (HSS), the SMS-GWMSC obtains the knowledge of the current serving Mobile Switching Center/Visitor Location Register (MSC/VLR) of the User Equipment (UE), to which it then forwards the mobile terminating short message.

Figure 9:
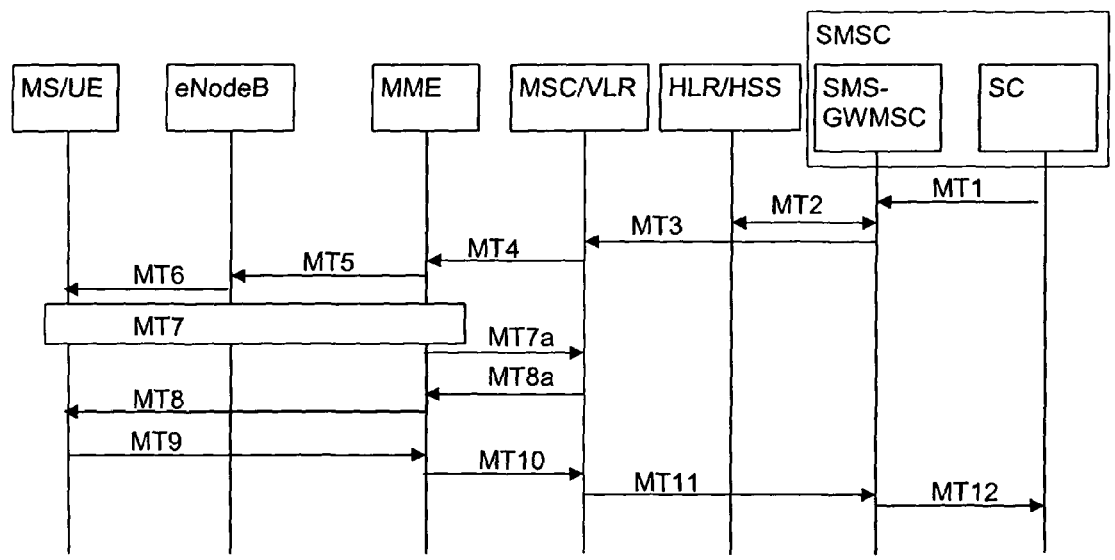
FIG. 9 schematically illustrates handling of a mobile terminated short message within a 3GPP framework.
Figure 10:
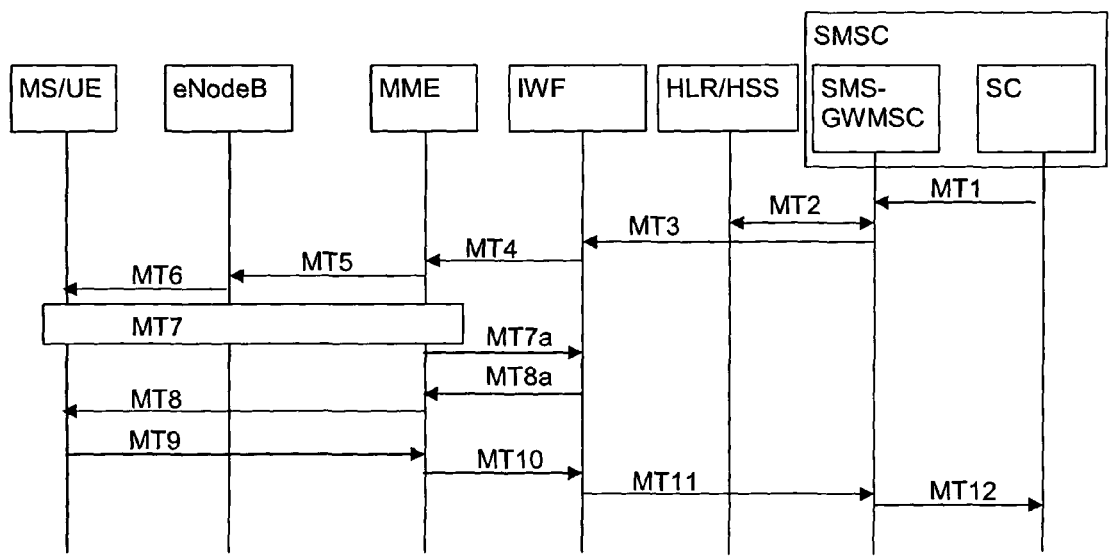
FIG. 10 schematically illustrates handling of a mobile terminated short message according to a first embodiment.

The procedure according to the 3GPP standard is shown in FIG. 9. FIG. 10 shows the case of the first embodiment of the present invention, where the serving Mobile Switching Center/Visitor Location Register (MSC/VLR) is replaced by the unit providing the Interworking Function (IWF). The following explanation refers to both FIGS. 9 and 10.

In a first step of the Mobile Terminating (MT) procedure, designated by Mt1, the SC of the Short Message Service Center (SMSC) transfers the message to the SMS-GWMSC of the Short Message Service Center (SMSC). A second step of the MT procedure, designated by MT2, corresponds to the Short Message Service Center (SMSC) querying the Home Location Register/Home Subscriber Server (HLR/HSS) for the User Equipment (UE) location (by means of requesting "RoutingInfoForShortMessage"). In a third step of the MT procedure, designated by MT3, the Short Message Service Center (SMSC) forwards the short message to the unit providing the Interworking Function (IWF) according to the first embodiment of the present invention, FIG. 10. A fourth step of the MT procedure, designated by MT4, corresponds to the Interworking Function (IWF) sending a paging request to the Mobility Management Entity (MME). A fifth step of the MT procedure, designated by MT5, corresponds to the Mobility Management Entity (MME) paging an eNodeB. A sixth step of the MT procedure, designated by MT6, corresponds to the eNodeB forwarding the paging request to the User Equipment (UE). A seventh step of the MT procedure, designated by MT7, corresponds to the User Equipment (UE) sending a Service Request. A further seventh step of the MT procedure, designated by MT7a, corresponds to transmitting the service request to the Interworking Function (IWF). A further eight step of the MT procedure, designated by MT8a, corresponds to transmitting a Downlink Unitdata to the Mobility Management Entity (MME). An eighth step of the MT procedure, designated by MT8, corresponds to the Mobility Management Entity (MME) sending a Downlink NAS Transport information to the User Equipment (UE). A ninth step of the MT procedure, designated by MT9, corresponds to the User Equipment (UE) sending an Uplink NAS Transport information to the Mobility Management Entity (MME). A tenth step of the MT procedure, designated by MT10, corresponds to the Mobility Management Entity (MME) sending an Uplink Unitdata information to the Interworking Function (IWF). A eleventh step of the MT procedure, designated by MT11, corresponds to the Interworking Function (IWF) sending a Delivery report to the SMS-GMSC of the Short Message Service Center (SMSC). A twelfth step of the MT procedure, designated by MT12, corresponds to the SMS-GMSC of the Short Message Service Center (SMSC) sending a Delivery report to the SC.

The Mobility Management Entity (MME) paging of the User Equipment (UE) is only necessary when the User Equipment (UE) is in idle mode. For User Equipments (UEs) in active mode, there is no need for the Mobility Management Entity (MME) to perform Paging after the fourth step. The Mobility Management Entity (MME) continues with the further seventh step MT7a (i.e. the fifth step MT5 to the seventh step MT7 are skipped). Thus, the Mobility Management Entity (MME) immediately (i.e. without any paging) sends a Downlink NAS Transport information (eighth step MT8) to the User Equipment (UE). This applies accordingly to all SMS MT cases (FIGS. 9 to 12).

In FIG. 10 (with regard to FIG. 9) the Mobile Switching Center/Visitor Location Register (MSC/VLR) is replaced by the Interworking Function (IWF), which exposes both the SGs interface to the MME and the interface to the SMSC as specified in TS23.040 (clause 4.2 "Transfer on reference point 3" according to 3GPP TS 23.040 version 8.5.0). There is also no change in relation to the SMS-GWMSC querying the Home Subscriber Server (HSS) for the UE location (i.e., the serving MSC/VLR which is in fact the IWF according to the second embodiment of the present invention). Analogous to FIG. 2, the functionality related to the SGs and D interfaces is the same as in FIG. 9, but otherwise the Interworking Function (IWF) has only those functions that are needed for SMS transfer. When there is only a single (logical) IWF in the network, it is possible to dispense with the HSS query. This would necessitate specific changes in the (otherwise unaffected) SMSC that have already been described in the context of FIG. 2 above.

Figure 11:
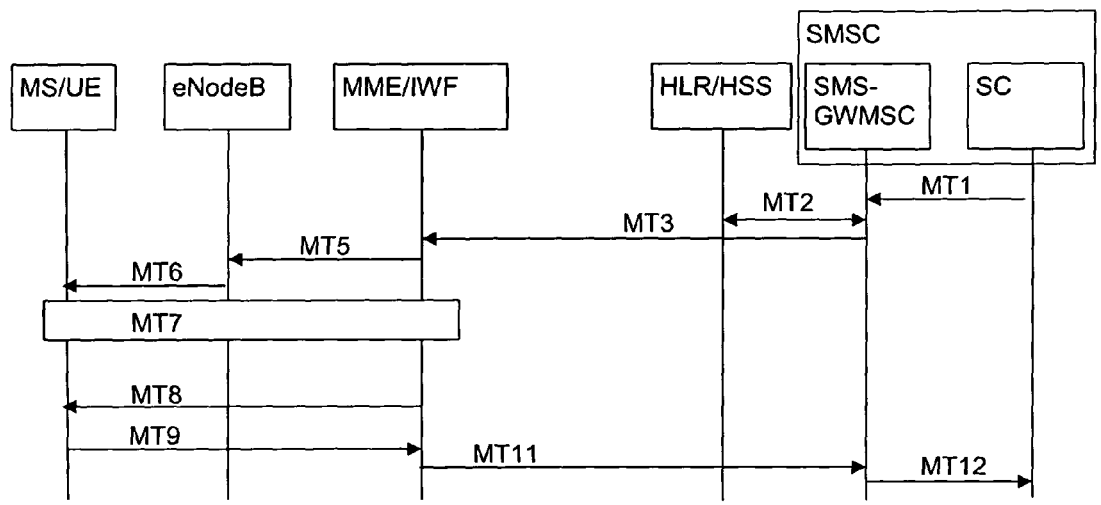
FIG. 11 schematically illustrates handling of a mobile terminated short message according to a second embodiment.

With regard to the second embodiment of the present invention and analogous to FIG. 3 for the Attach case and FIG. 7 for the SMS MO case, the Interworking Function (IWF) may be integrated into the Mobility Management Entity (MME), resulting in the MT flow depicted in FIG. 11. Again, we do not need the SGs interface—the combined MME/IWF receives the short message using the existing interface from the SMSC as specified in TS23.040 (clause 4.2 "Transfer on reference point 3" according to 3GPP TS 23.040 version 8.5.0). The HSS query, in this case, will return the combined MME/IWF to the SMS-GWMSC that was registered in the HSS upon UE attach, as described in the context of FIG. 3.

Figure 4:
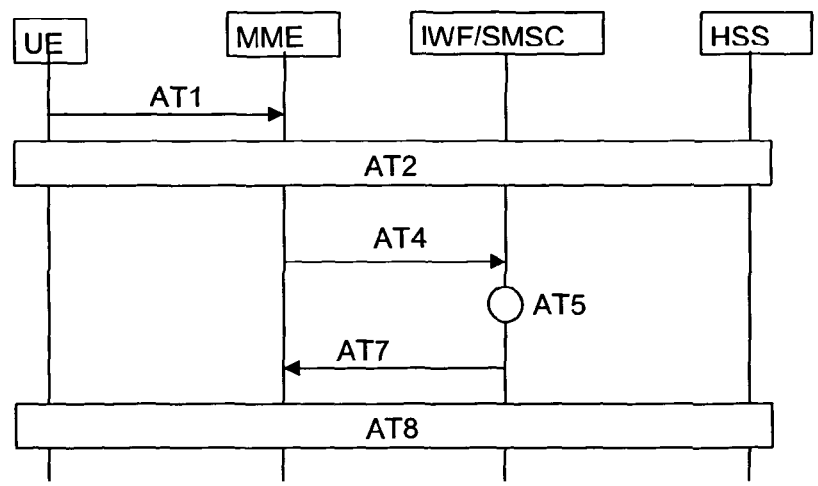
FIG. 4 schematically illustrates an attach procedure of a User Equipment to an Evolved Packet System (EPS) according to a third embodiment.
Figure 12:
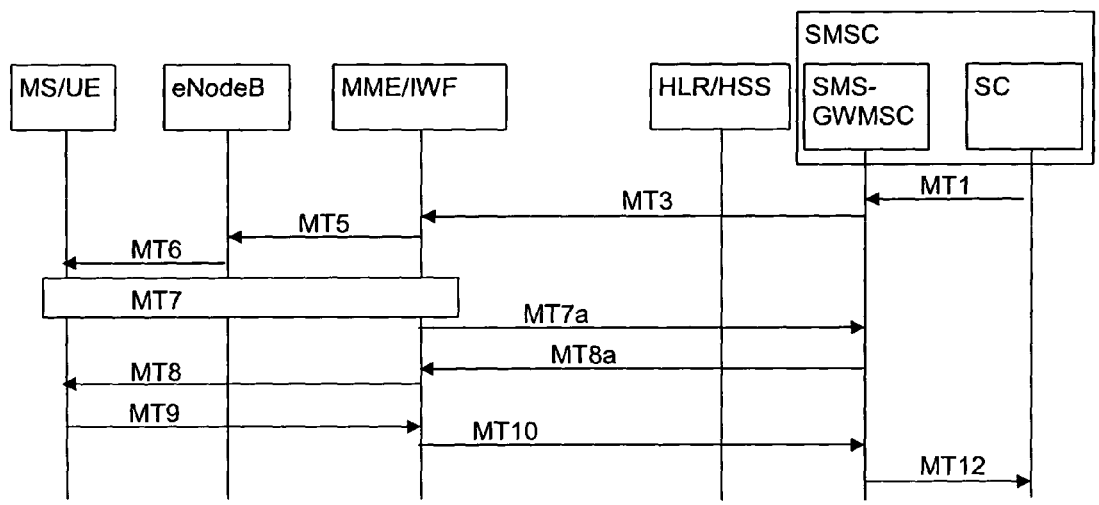
FIG. 12 schematically illustrates handling of a mobile terminated short message according to a third embodiment.

With regard to the third embodiment of the present invention and analogous to FIG. 4 for the Attach case and FIG. 8 for the SMS MO case, the Interworking Function (IWF) can be integrated into the Short Message Service Center (SMSC), as depicted for the MT case in FIG. 12. The interface as specified in TS23.040 (clause 4.2 "Transfer on reference point 3" according to 3GPP TS 23.040 version 8.5.0) is not needed, while the SGs interface is used between the Mobility Management Entity (MME) and the combined SMSC/IWF for SMS transfer. As can be seen, there is no Home Subscriber Server (HSS) query involved—there is anyway no CS location information identifying the IWF in the HSS, since no CS location update was performed when the UE attached resp. performed the TA/LA update. Given that the Interworking Function (IWF) is collocated with the Short Message Service Center (SMSC), the need for the SMS GMSC to obtain the UE's location is eliminated—instead, the message can directly be forwarded to the internal Interworking Function (IWF).

Figure 13:
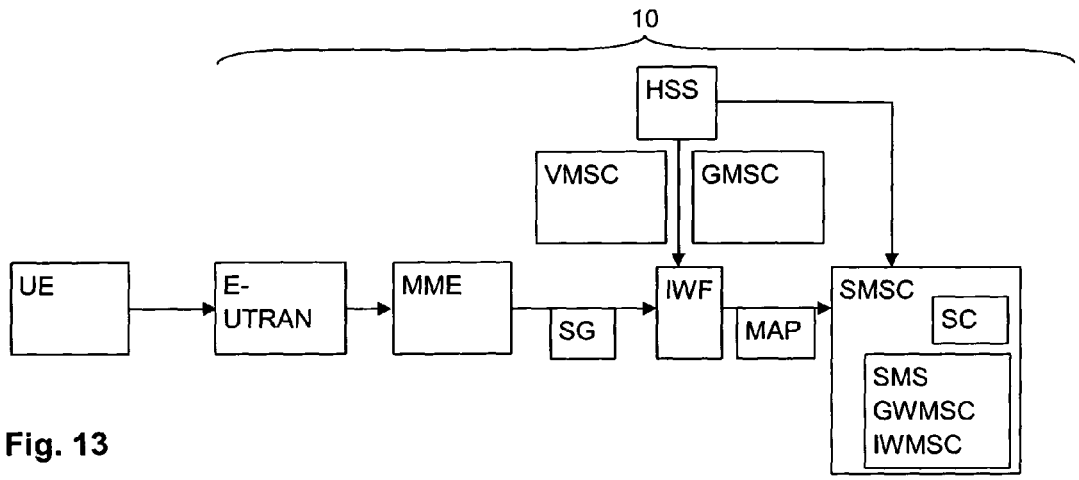
FIG. 13 schematically illustrates a network configuration according to a first embodiment.
Figure 14:
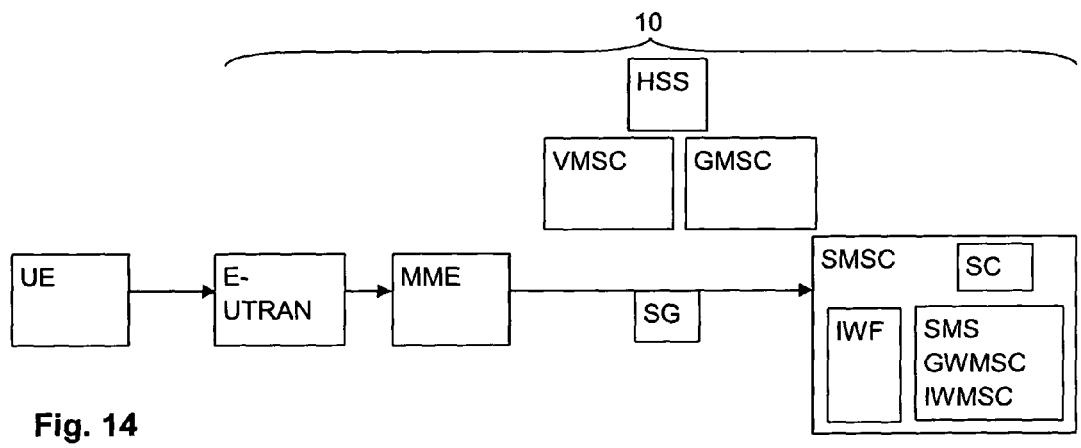
FIG. 14 schematically illustrates a network configuration according to a third embodiment.
Figure 15:
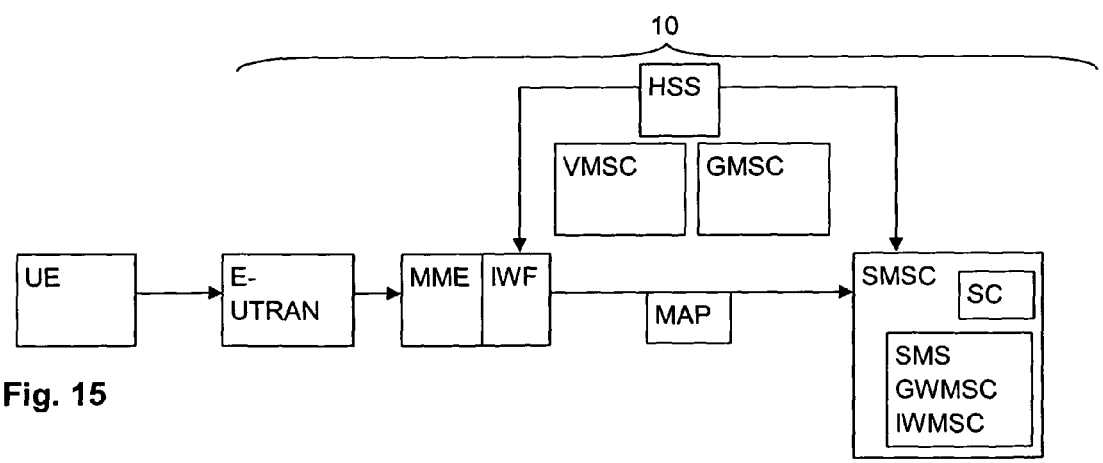
FIG. 15 schematically illustrates a network configuration according to a second embodiment.

FIGS. 13 to 15 schematically illustrate the network configuration of a core network 10 according to three different embodiments of the present invention. In all three embodiments of the present invention, the core network 10 comprises a Mobility Management Entity (MME), a Home Subscriber Server (HSS), a Short Message Service Center (SMSC), a SMS-GWMSC (SMS Gateway Mobile Switching Center), a SMS-IWMSC (SMS-Interworking Mobile Switching Center), a GMSC (Gateway Mobile Switching Center), an E-UTRAN and a VMSC (Visited Mobile Switching Center).

FIG. 13 corresponds to the first embodiment: the unit providing the Interworking Function (IWF) is an intermediate unit having an SGs interface and an interface as specified in TS23.040 (clause 4.2 "Transfer on reference point 3" according to 3GPP TS 23.040 version 8.5.0).

FIG. 14 corresponds to the third embodiment: the Interworking Function (IWF) is integrated in the Short Message Service Center (SMSC).

FIG. 15 corresponds to the second embodiment: the Interworking Function (IWF) is integrated in the Mobility Management Entity (MME).

According to the first and third embodiments of the present invention, the Interworking Function (IWF) does not have proper location information of the User Equipment (UE). This is only the case in the second embodiment (when the Interworking Function (IWF) is integrated in the Mobility Management Entity (MME)). Therefore, the realization of the present invention according to the first and third embodiments might necessitate the implementation of a lawful interception functionality for SMS in the Mobility Management Entity (MME).

According to all embodiments of the present invention, it is not necessary for the Interworking Function (IWF) to maintain the User Equipment's (UE's) Mobility Management (MM) context in the same way as an Mobile Switching Center/Visitor Location Register (MSC/VLR). It can be left up to the implementation of the Interworking Function (IWF) whether the Interworking Function (IWF) supports retrieval of User Equipment (UE) Mobility Management (MM) context information to/from other Mobile Switching Center/Visitor Location Register (MSC/VLR) units or other Interworking Function (IWF) units.

Exemplary embodiments of the present invention include: First exemplary embodiment: Core Network 10 for the transmission of a short message in an Evolved Packet System (EPS) mobile communication network, the Core Network 10 comprising a Mobile Switching Center (MSC) according to a GERAN/UTRAN radio access network (GSM/UMTS mobile communication network) standard, the Core Network 10 further comprising a Mobility Management Entity (MME) and a Short Message Service Center (SMSC), and the Core Network further comprising a unit providing an Interworking Function (IWF) for the handling of short messages such that the Mobile Switching Center (MSC) is bypassed with regard to the transmission and/or the reception of short messages with respect to a User Equipment (UE) having a data connection to the Evolved Packet System (EPS) mobile communication network.

Second exemplary embodiment: Core Network 10 according to the first exemplary embodiment, wherein the unit providing the Interworking Function (IWF) is an intermediate unit having an SGs interface with the Mobility Management Entity (MME) and an SMSC-interface with the Short Message Service Center (SMSC).

Third exemplary embodiment: Core Network 10 according to the first exemplary embodiment, wherein the unit providing the Interworking Function (IWF) is integrated in the Short Message Service Center (SMSC), having an SGs interface with the Mobility Management Entity (MME).

Fourth exemplary embodiment: Core Network 10 according to the first exemplary embodiment, wherein the unit providing the Interworking Function (IWF) is integrated in the Mobility Management Entity (MME), having an SMSC-interface with the Short Message Service Center (SMSC).

Fifth exemplary embodiment: Method for the handling of a short message in an Evolved Packet System (EPS) mobile radio access network, the method comprising the steps of:
attaching a User Equipment (UE) to the circuit switched network parts, the circuit switched network parts comprising a Mobile Switching Center (MSC) according to a GERAN/UTRAN radio access network (GSM/UMTS mobile communication network) standard, and the User Equipment (UE) having or requesting a data connection to the Evolved Packet System (EPS) mobile radio access network,
transmitting the short message by using a unit providing an Interworking Function (IWF) for the handling of the short message such that the Mobile Switching Center (MSC) is bypassed with regard to the transmission and/or the reception of short messages.

Sixth exemplary embodiment: Method according to the fifth exemplary embodiment, wherein the unit providing the Interworking Function (IWF) is an intermediate unit having an SGs interface and an SMSC-interface with the SMSC.

Seventh exemplary embodiment: Method according to the fifth exemplary embodiment, wherein the unit providing the Interworking Function (IWF) is integrated in the Short Message Service Center (SMSC), having an SGs interface.

Eighth exemplary embodiment: Method according to the fifth exemplary embodiment, wherein the unit providing the Interworking Function (IWF) is integrated in the Mobility Management Entity (MME), having an SMSC-interface with the SMSC.

Ninth exemplary embodiment: Unit providing an Interworking Function (IWF) for the handling of short messages in an Evolved Packet System (EPS) mobile communication access network having a Core Network 10, the Core Network 10 comprising a Mobile Switching Center (MSC) according to a GERAN/UTRAN radio access network (GSM/UMTS mobile communication network) standard, the Core Network 10 further comprising a Mobility Management Entity (MME) and a Short Message Service Center (SMSC), wherein the unit providing the Interworking Function (IWF) is an intermediate unit having an SGs interface with the Mobility Management Entity (MME) and an SMSC-interface with the Short Message Service Center (SMSC), wherein the handling of short messages is such that the Mobile Switching Center (MSC) is bypassed with regard to the transmission and/or the reception of short messages with respect to a User Equipment (UE) having a data connection to the Evolved Packet System (EPS) mobile radio access network.

Tenth exemplary embodiment: Short Message Service Center (SMSC), having an integrated unit providing an Interworking Function (IWF) for the handling of short messages in an Evolved Packet System (EPS) mobile radio access network having a Core Network 10, the Core Network 10 comprising a Mobile Switching Center (MSC) according to a GERAN/UTRAN radio access network (GSM/UMTS mobile communication network) standard, the Core Network 10 further comprising a Mobility Management Entity (MME), wherein the unit providing the Interworking Function (IWF) has an SGs interface with the Mobility Management Entity (MME), wherein the handling of short messages is such that the Mobile Switching Center (MSC) is bypassed with regard to the transmission and/or the reception of short messages with respect to a User Equipment (UE) having a data connection to the Evolved Packet System (EPS) mobile communication network.

Eleventh exemplary embodiment: Mobility Management Entity (MME), having an integrated unit providing an Interworking Function (IWF) for the handling of short messages in an Evolved Packet System (EPS) mobile communication network having a Core Network 10, the Core Network 10 comprising a Mobile Switching Center (MSC) according to a GERAN/UTRAN radio access network (GSM/UMTS mobile communication network) standard, the Core Network 10 further comprising a Short Message Service Center (SMSC), wherein the unit providing the Interworking Function (IWF) has an SMSC-interface with the Short Message Service Center (SMSC), wherein the handling of short messages is such that the Mobile Switching Center (MSC) is bypassed with regard to the transmission and/or the reception of short messages with respect to a User Equipment (UE) having a data connection to the Evolved Packet System (EPS) mobile radio access network.

Twelfth exemplary embodiment: Program comprising a computer readable program code for controlling a Unit providing an Interworking Function (IWF) for the handling of short messages in an Evolved Packet System (EPS) mobile communication access network according to the ninth exemplary embodiment.

Thirteenth exemplary embodiment: Program comprising a computer readable program code for controlling a Short Message Service Center (SMSC) according to exemplary embodiment.

Fourteenth exemplary embodiment: Program comprising a computer readable program code for controlling a Mobility Management Entity (MME) according to eleventh exemplary embodiment.

The invention claimed is:
1. A core network for transmission of short messages in an Evolved Packet System (EPS) mobile communication network, the core network providing SMS over SGs functionality and the core network comprising:
a Mobility Management Entity (MME);
a Short Message Service Center (SMSC);
a unit providing an Interworking Function (IWF) for handling of short messages;
wherein the unit providing the IWF is configured to process short messages transmitted from and received by a User Equipment (UE) having a data connection to the EPS mobile communication network, the transmission and reception of the short messages being provided via com- munication between the MME and the SMSC via the IWF without involving a Mobile Switching Center (MSC).

2. The core network according to claim 1, wherein the core network provides SMS functionality for the UE, wherein the SMS functionality is provided in a non-native manner with regard to the EPS.

3. The core network according to claim 1, wherein the unit providing the IWF is an intermediate unit having an SGs interface with the MME and an SMSC-interface with the SMSC.

4. The core network according to claim 1, wherein the unit providing the IWF is integrated in the SMSC, having an SGs interface with the MME.

5. The core network according to claim 1, wherein the unit providing the IWF is integrated in the MME, having an SMSC-interface with the Short Message Service Center (SMSC).

6. A method for handling short messages in an Evolved Packet System (EPS) mobile radio access network comprising a Mobility Management Entity (MME) and a Short Message Service Center (SMSC), the method comprising the steps of:
   attaching a User Equipment (UE) to circuit switched network parts, wherein the UE has or requests a data connection to the Evolved Packet System (EPS) mobile radio access network;
   transmitting a first short message from the UE by using a unit providing an Interworking Function (IWF) for the handling of short messages; and
   receiving a second short message at the UE by using the unit providing the IWF;
   wherein the MME and the SMSC are in communication via the IWF without involving a Mobile Switching Center (MSC) with respect to communication of the first and second short messages.

7. The method according to claim 6, wherein SMS functionality is provided for the UE, wherein the SMS functionality is provided in a non-native manner with regard to the EPS.

8. A Short Message Service Center (SMSC), comprising:
   an integrated unit, comprising a processor, configured to provide an Interworking Function (IWF) for handling of short messages in an Evolved Packet System (EPS) mobile radio access network having a core network, the core network providing SMS over SGs functionality and comprising a Mobility Management Entity (MME);
   wherein the unit providing the IWF is configured to process short messages transmitted from and received by a User Equipment (UE) having a data connection to the EPS mobile radio access network, the transmission and reception of the short messages being provided via communication between the MME and the SMSC via the IWF without involving a Mobile Switching Center (MSC), and wherein the unit providing the IWF has an SGs interface with the MME.

9. A Mobility Management Entity (MME), comprising:
   an integrated unit, comprising a processor, configured to provide an Interworking Function (IWF) for handling of short messages in an Evolved Packet System (EPS) mobile communication network having a core network, the core network providing SMS over SGs functionality and comprising a Short Message Service Center (SMSC);
   wherein the unit providing the IWF is configured to process short messages transmitted from and received by a User Equipment (UE) having a data connection to the EPS mobile radio access network, the transmission and reception of the short messages being provided via communication between the MME and the SMSC via the IWF without involving a Mobile Switching Center (MSC), and wherein the unit providing the IWF has an SMSC-interface with the Short Message Service Center (SMSC).

10. A tangible, non-transitory computer-readable medium having computer-executable instructions for transmitting short messages in an Evolved Packet System (EPS) mobile communication network stored thereon, the EPS mobile communication network comprising a Mobility Management Entity (MME) and a Short Message Service Center (SMSC), the computer-executable instructions comprising instructions for:
   attaching a User Equipment (UE) to circuit switched network parts, wherein the UE has or requests a data connection to the Evolved Packet System (EPS) mobile radio access network;
   transmitting a first short message by using a unit providing an Interworking Function (IWF) for the handling of short messages;
   receiving a second short message at the UE by using the unit providing the IWF;
   wherein the MME and the SMSC are in communication via the IWF without involving a Mobile Switching Center (MSC) with respect to communication of the first and second short messages.

* * * * *